United States Patent
Hashimoto

(10) Patent No.: US 9,493,153 B2
(45) Date of Patent: Nov. 15, 2016

(54) VEHICLE AND CONTROL METHOD OF VEHICLE

(71) Applicant: Keita Hashimoto, Toyota (JP)

(72) Inventor: Keita Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 14/408,660

(22) PCT Filed: Oct. 11, 2013

(86) PCT No.: PCT/IB2013/002333
§ 371 (c)(1),
(2) Date: Dec. 17, 2014

(87) PCT Pub. No.: WO2014/064502
PCT Pub. Date: May 1, 2014

(65) Prior Publication Data
US 2015/0175153 A1   Jun. 25, 2015

(30) Foreign Application Priority Data
Oct. 22, 2012 (JP) .................. 2012-232734

(51) Int. Cl.
*B60W 20/16* (2016.01)
*B60W 20/13* (2016.01)
*F01N 9/00* (2006.01)
*F01N 3/20* (2006.01)

(52) U.S. Cl.
CPC ............. *B60W 20/16* (2016.01); *B60W 20/13* (2016.01); *F01N 3/2013* (2013.01); *F01N 9/00* (2013.01); *B60W 2520/10* (2013.01); *B60W 2520/105* (2013.01); *B60W 2530/12* (2013.01); *F01N 2590/11* (2013.01); *F01N 2900/10* (2013.01); *Y02T 10/26* (2013.01); *Y02T 10/47* (2013.01); *Y02T 10/54* (2013.01); *Y10S 903/902* (2013.01)

(58) Field of Classification Search
CPC .................. B60W 20/1082; B60W 2520/10; B60W 2520/105; B60W 2530/12; Y02T 10/47; Y02T 10/54; F01N 2590/11
See application file for complete search history.

(56) References Cited

U.S. PATENT DOCUMENTS

| | | | | |
|---|---|---|---|---|
| 5,323,607 A * | 6/1994 | Tanaka | ...................... | F01N 9/00 60/300 |
| 5,785,138 A * | 7/1998 | Yoshida | ................... | B60K 6/46 60/300 |
| 2011/0035136 A1* | 2/2011 | Niimi | ...................... | F01N 9/002 60/300 |
| 2011/0277449 A1* | 11/2011 | Gonze | ................... | F01N 3/2026 60/286 |
| 2012/0260638 A1* | 10/2012 | Yoshioka | .............. | F01N 3/2013 60/300 |
| 2013/0305692 A1* | 11/2013 | Hashimoto | ............... | F01N 9/00 60/299 |
| 2014/0000245 A1* | 1/2014 | Harada | ..................... | F01N 9/00 60/286 |

FOREIGN PATENT DOCUMENTS

| | | |
|---|---|---|
| EP | 2716885 A1 | 4/2014 |
| JP | H05321645 A | 12/1993 |

(Continued)

*Primary Examiner* — Dale W Hilgendorf
(74) *Attorney, Agent, or Firm* — Oliff PLC

(57) ABSTRACT

A vehicle includes an engine, an electrically heated catalyst configured to purify exhaust gas of the engine, and a controller configured to control energizing power to the electrically heated catalyst. The controller is configured to determine the energizing power based on a vehicle speed of the vehicle and an acceleration of the vehicle, when energizing the electrically heated catalyst before the engine is started.

8 Claims, 3 Drawing Sheets

(56) References Cited

FOREIGN PATENT DOCUMENTS

| | | |
|---|---|---|
| JP | H06178401 A | 6/1994 |
| JP | 2007176392 A | 7/2007 |
| JP | 2010023758 A | 2/2010 |
| JP | 2010236544 A | 10/2010 |
| JP | 2011174393 A | 9/2011 |
| WO | 2012/164715 A1 | 12/2012 |

* cited by examiner

VEHICLE AND CONTROL METHOD OF VEHICLE

BACKGROUND OF THE INVENTION

1. Field of the Invention

The invention relates to a vehicle, and more particularly, to a vehicle provided with an electrically heated catalyst that purifies exhaust gas of an engine, as well as to control method of such a vehicle.

2. Description of Related Art

Japanese Patent Application Publication No. 5-321645 (JP 5-321645 A) describes technology in which, in a vehicle provided with an internal combustion engine and an Electrically Heated Catalyst (EHC) that purifies exhaust gas of the internal combustion engine, when it is determined that it is necessary to heat the EHC while the engine is stopped, the EHC starts to be energized after calculating an energizing time required to raise the EHC temperature to an activation temperature based on the EHC temperature before the internal combustion, engine is started, and the EHC stops being energized when the energizing time has passed after the EHC started to be energized.

With the technology described in JP 5-321645 A, the EHC energizing time is determined based on the EHC temperature. Therefore, it is difficult to energize the EHC taking into account (anticipating) a vehicle running pattern from the time the EHC starts to be energized until the internal combustion engine is actually started. Therefore, the EHC temperature may end up dropping due to heat loss if the internal combustion engine is not started for a while even after the EHC has stopped being energized. If the internal combustion engine is started in this state, exhaust gas purifying performance may be difficult to ensure.

SUMMARY OF THE INVENTION

The invention relates to technology which, in a vehicle provided with an engine and an Electrically Heated Catalyst (EHC), appropriately ensures exhaust gas purifying performance after the engine is started.

A first aspect of the invention relates to a vehicle that includes an engine, an electrically heated catalyst configured to purify exhaust gas of the engine, and a controller configured to control energizing power to the electrically heated catalyst. The controller is configured to determine the energizing power based on a vehicle speed of the vehicle and an acceleration of the vehicle, when energizing the electrically heated catalyst before the engine is started.

In the vehicle described above, the controller may increase the energizing power the higher the vehicle speed is and the greater the acceleration of the vehicle is, in a high speed range in which the vehicle speed is equal to or higher than a predetermined speed.

In the vehicle described above, the controller may increase the energizing power the lower the vehicle speed is, in a non-high speed range in which the vehicle speed is lower than the predetermined speed.

In the vehicle described above, the engine may be started when a required power of the vehicle exceeds a predetermined amount or when the vehicle speed exceeds a vehicle speed threshold value that is higher than the predetermined speed.

The vehicle described above may be a hybrid vehicle that runs by power of at least one of the engine and an electric motor.

A second aspect of the invention relates to a control method of a vehicle provided with an engine and an electrically heated catalyst. This control method includes determining an energizing power based on a vehicle speed of the vehicle and an acceleration of the vehicle, when energizing an electrically heated catalyst before an engine is started.

According to the invention, in a vehicle provided with an engine and an EHC, the energizing power to the EHC is determined using the vehicle speed and the vehicle acceleration, when energizing the EHC before the engine is started. As a result, the energizing power to the EHC is able to be determined according to a vehicle running pattern until the engine is started. Accordingly, the exhaust gas purifying performance, after the engine is started, is able to be suitably ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
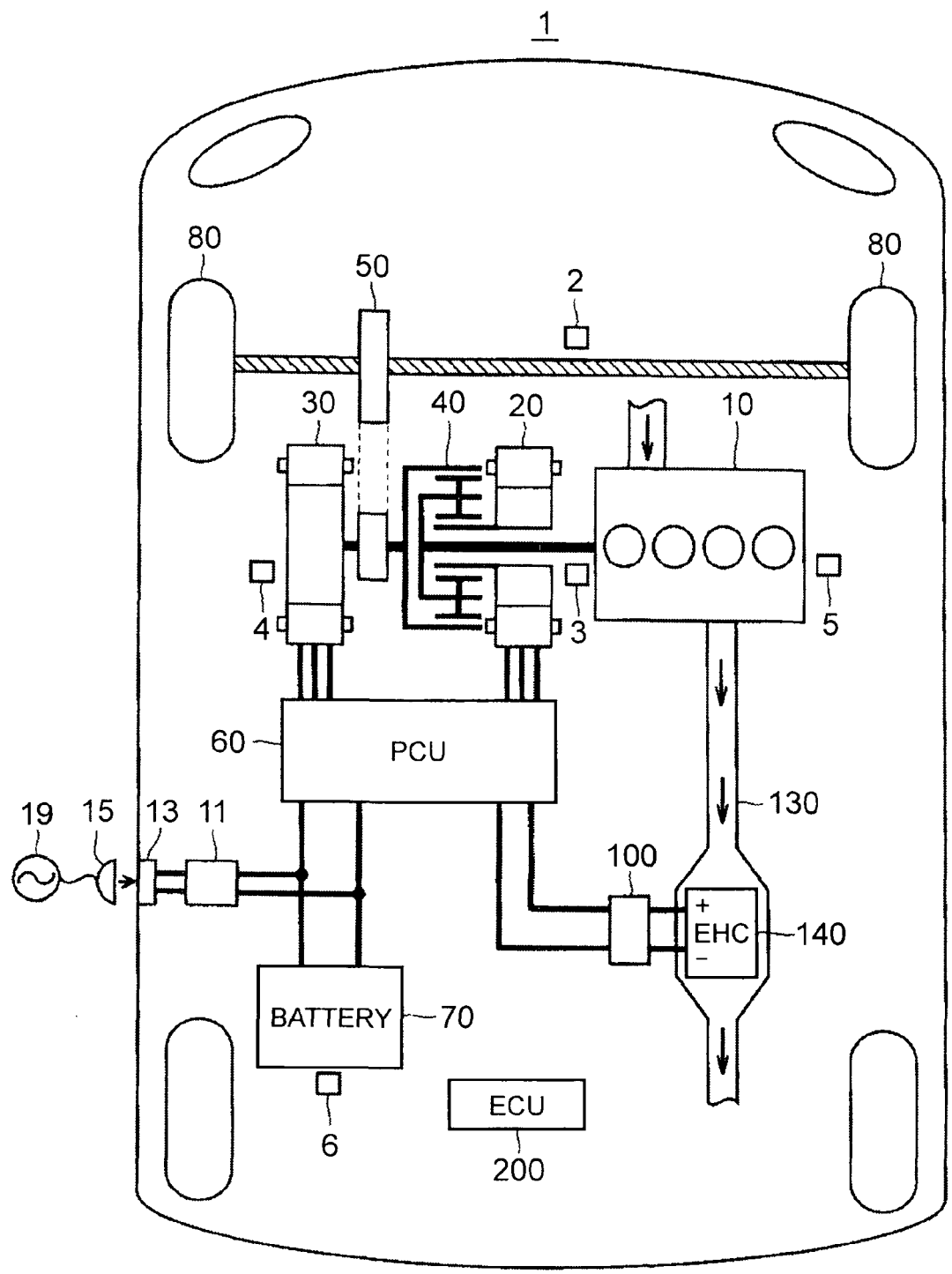
FIG. 1 is an overall block diagram of a vehicle according to one example embodiment of the invention.

Hereinafter, example embodiments of the invention will be described in detail with reference to the accompanying drawings. Like or corresponding portions in the drawings will be denoted by like reference numerals, and descriptions of these portions will not be repeated.

FIG. 1 is an overall block diagram of a vehicle 1 according to one example embodiment of the invention. The vehicle 1 includes an engine 10, a first Motor-Generator (first MG) 20, a second Motor-Generator (second MG) 30, a power split device 40, a reduction gear 50, a power control unit (PCU) 60, a battery 70, driving wheels 80, and an Electronic Control Unit (ECU) 200.

The engine 10 is an internal combustion engine that generates driving force for rotating a crankshaft by combustion energy generated by combusting a mixture of air and fuel (i.e., an air-fuel mixture). The first MG 20 and the second MG 30 are motor-generators that are driven by alternating current.

The vehicle 1 is a hybrid vehicle that runs by power output from at least one of the engine 10 and the second MG 30. The driving force generated by the engine 10 is split into two paths by the power split device 40. One of the paths is a path along which the driving force is transmitted to the driving wheels 80 via the reduction gear 50, and the other path is a path along which the driving force is transmitted to the first MG 20.

The power split device 40 is formed by a planetary gear set that includes a sun gear, pinion gears, a carrier, and a ring gear. The pinion gears are in mesh with the sun gear and the ring gear. The carrier pivotally supports the pinion gears and is connected to the crankshaft of the engine 10. The sun gear is connected to a rotating shaft of the first MG 20. The ring gear is connected to a rotating shaft of the second MG 30, and the reduction gear 50.

The PCU 60 is controlled according to a control signal from the ECU 200. The PCU 60 converts direct-current (DC) power supplied from the battery 70 to alternating-current (AC) power that drives the first MG 20 and the second MG 30. The PCU 60 outputs the converted AC power to both the first MG 20 and the second MG 30. Accordingly, the first MG 20 and the second MG 30 are driven by power stored in the battery 70. The PCU 60 is also able to convert AC power generated by the first MG 20 and the second MG 30 to DC power, and charge the battery 70 with this converted DC power.

The battery 70 is a DC power supply that stores power for driving the first MG 20 and the second MG 30. The battery 70 is formed by a secondary battery such as a nickel-metal hydride secondary battery or a lithium-ion secondary battery, for example. An output voltage of the battery 70 is a high voltage of approximately 200 volts, for example. A large capacity capacitor may also be used instead of the battery 70.

Moreover, the vehicle 1 includes an exhaust passage 130. Exhaust gas discharged from the engine 10 is discharged into the atmosphere through this exhaust passage 130.

An Electrically Heated Catalyst (EHC) 140 is provided midway in the exhaust passage 130. The EHC 140 is a catalytic device configured to electrically heat a catalyst with an electric heater.

The EHC 140 is connected to the PCU 60 via a switching unit 100. The switching unit 100 includes a relay that electrically connects and disconnects the EHC 140 to and from the PCU 60 based on a control signal from the ECU 200. If DC power from the PCU 60 is supplied to the EHC 140 when the EHC 140 is electrically connected to the PCU 60, i.e., when the relay provided in the switching unit 100 is closed, the EHC 140 will be heated. Hereinafter, a state in which DC power from the PCU 60 is supplied to the EHC 140 will be referred to as an "EHC energizing" state, and the power (unit: watts) supplied from the PCU 60 to the EHC 140 will be referred to as "EHC energizing power Pehc". This EHC energizing power Pehc is regulated by the ECU 200 controlling the PCU 60.

The vehicle 1 is a hybrid vehicle that is capable of "external charging", i.e., charging the battery 70 with power from an external power supply 19 (such as a household power supply) provided outside the vehicle. That is, the vehicle 1 is a so-called plug-in hybrid vehicle. The vehicle 1 is not necessarily limited to being a plug-in hybrid vehicle, and may also be a normal hybrid vehicle.

The vehicle 1 includes a connector 13 and a charger 11 for performing external charging. The connector 13 is configured to be able to connect to a connector 15 of the external power supply 19. The charger 11 converts power from the external power supply 19 to direct current and outputs it to the battery 70 based on a control signal from the ECU 200.

Furthermore, the vehicle 1 includes a vehicle speed sensor 2, resolvers 3 and 4, an engine speed sensor 5, and a monitoring sensor 6. The vehicle speed sensor 2 detects a rotation speed of a drive shaft as a vehicle speed V. The resolver 3 detects a rotation speed Nm1 of the first MG 20. The resolver 4 detects a rotation speed Nm2 of the second MG 30. The engine speed sensor 5 detects an engine speed Ne. The monitoring sensor 6 detects the state, e.g., the voltage, current, and temperature and the like, of the battery 70. These sensors output the detection results to the ECU 200. A State-of-Charge (SOC) of the battery 70 is calculated by the ECU 200 based on the detection results of the monitoring sensor 6.

The ECU 200 has a Central Processing Unit (CPU) and memory, neither of which are shown, built in. The ECU 200 performs predetermined calculations based on information stored in the memory, and controls the various equipment of the vehicle 1 based on the results.

The ECU 200 selectively switches the running mode of the vehicle 1 between an "EV running mode" in which the engine 10 is stopped and the vehicle 1 is run by the power of the second MG 30, and a "HV running mode" in which the engine 10 is operated and the vehicle 1 is run by the power of both the engine 10 and the second MG 30, based on the running state of the vehicle 1. In the vehicle 1, the engine 10 that is stopped is started for mainly one of the five following reasons. (Reason 1) The power required by the user is greater than a predetermined power. (Reason 2) The vehicle speed V is exceeding a threshold value (such as 100 km/h). (Reason 3) There is a demand for heat. (Reason 4) There is a need to charge the battery 70 due to a low SOC. (Reason 5) There is a demand from an On-Board Diagnosis (OBD).

In the vehicle 1 having this kind of structure, the ECU 200 determines whether there is a need to heat the EHC 140 based on the EHC temperature or the SOC, before starting the engine 10. If it is determined that there is a need to heat the EHC 140, the ECU 200 energizes the EHC.

It is difficult to anticipate a vehicle running pattern (i.e., the engine startup timing) after the EHC starts to be energized from the EHC temperature or the SOC. Therefore, the EHC temperature may end up dropping below the activation temperature due to heat loss if the internal combustion engine is not started for a while after the EHC has stopped being energized. If the internal combustion engine is started in this state, exhaust gas purifying performance may be unable to be ensured, so emissions may deteriorate. If the EHC is energized again to inhibit this deterioration in emissions, power consumed by the initial energizing of the EHC is wasted, which may lead to poorer fuel efficiency.

Therefore, when energizing the EHC before the engine 10 is started, the ECU 200 according to this example embodiment efficiently energizes the EHC while estimating the next engine startup timing.

Figure 2:
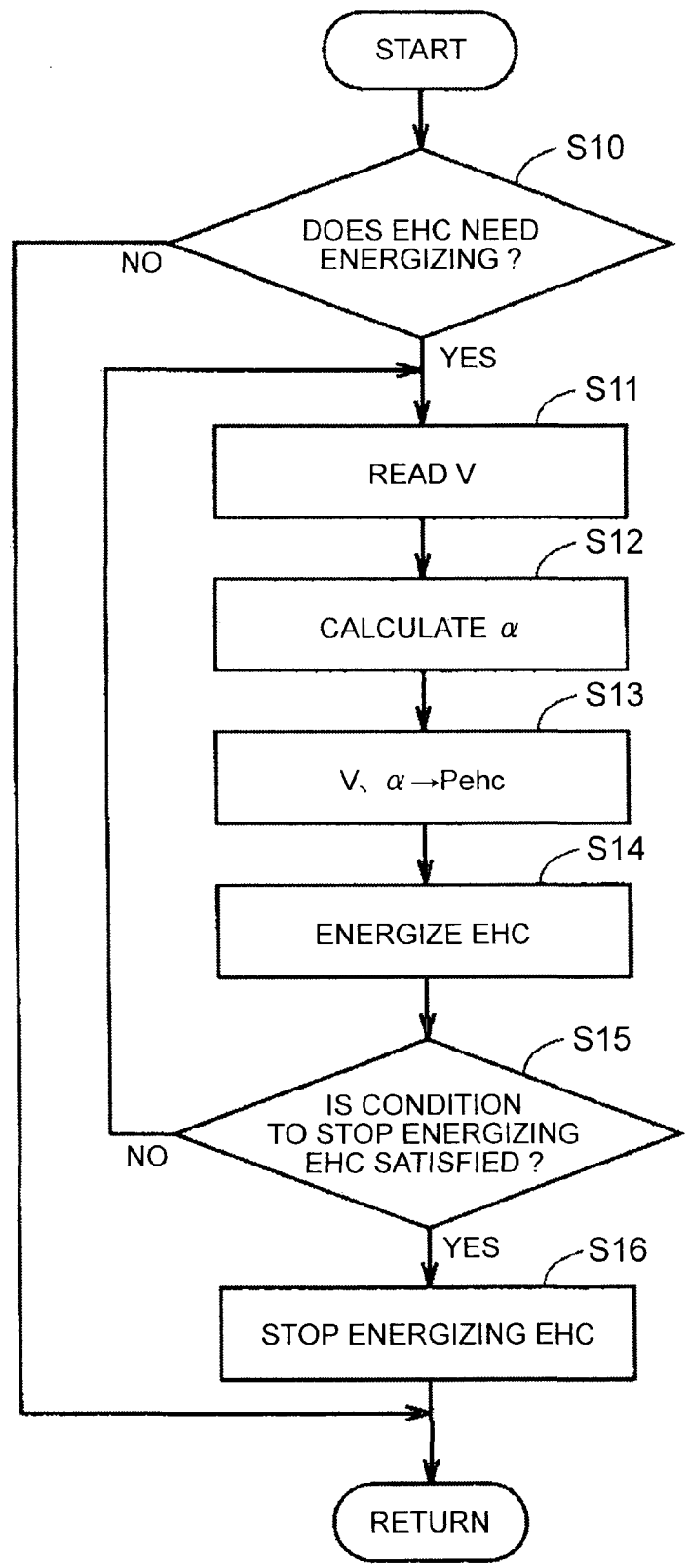
FIG. 2 is a flowchart illustrating a routine executed by an ECU according to the example embodiment.

FIG. 2 is a flowchart illustrating a routine executed by the ECU (can be regarded as a controller) 200 when energizing the EHC. The routine in the flowchart in FIG. 2 is repeatedly executed at predetermined cycles before the engine 10 is started (i.e., while the engine 10 is stopped).

In step S10, the ECU 200 determines whether the EHC needs to be energized based on the EHC temperature or the SOC. If the EHC does not need to be energized (i.e., NO in step S10), this cycle of the routine ends.

If the EHC needs to be energized (i.e., YES in step S10), the ECU 200 proceeds on to step S11. In step S11, the ECU 200 detects the vehicle speed V, and then in step S12, the ECU 200 calculates a vehicle acceleration α from a rate of change in the vehicle speed V.

In step S13, the ECU 200 determines the EHC energizing power Pehc using the vehicle speed V and the vehicle acceleration α.

Hereinafter, the method for determining the EHC energizing power Pehc will be described. The method for determining the EHC energizing power Pehc described below is only an example. The invention is not limited to this.

In the vehicle 1, the engine 10 that is stopped is started for one of the five reasons described above. According to Reason 1 and Reason 2 of these reasons, the timing at which the engine 10 is started is able to be estimated to some degree by the vehicle running pattern. This vehicle running pattern is, more specifically, the vehicle speed V and the vehicle acceleration α and the like.

The engine startup timing due to Reason 1, i.e., the timing at which the power required by the user exceeds a predetermined power, relies on the vehicle speed V.

That is, during steady travel in the medium speed range or the high speed range, the probability that the user will instantaneously require a large amount of power is relatively low, so it is estimated that it will take a relatively long time for the required power to exceed the predetermined power. On the other hand, when stopped or running in the low speed range, it is estimated that the probability that the user will instantaneously require a large amount of power to accelerate the vehicle 1 is relatively high. Therefore, it is estimated that the required power will exceed the predetermined power relatively quickly (i.e., at a relatively early timing). Therefore, the engine startup timing may be estimated using the vehicle speed V, and the EHC energizing power Pehc may be determined such that the EHC temperature rises to equal to or higher than the activation temperature by the estimated engine startup timing. For example, the EHC energizing power Pehc may be set to a larger value to raise the EHC temperature to equal to or greater than the activation temperature earlier in a low speed range at which it is estimated that the engine will be started at a relatively early timing, than in the medium or high speed range in which it is estimated that the engine will be started at a relatively late timing.

The engine startup timing due to Reason 2, i.e., the timing at which the vehicle speed V exceeds the threshold value, is able to be estimated from the current vehicle speed V and the vehicle acceleration α. Therefore, in a range where the vehicle speed V is close to the threshold value, the engine startup timing may be estimated from the current vehicle speed V and the current vehicle acceleration α, and the EHC energizing power Pehc may be determined such that the EHC temperature rises to equal to or higher than the activation temperature by the estimated engine startup timing.

Figure 3:
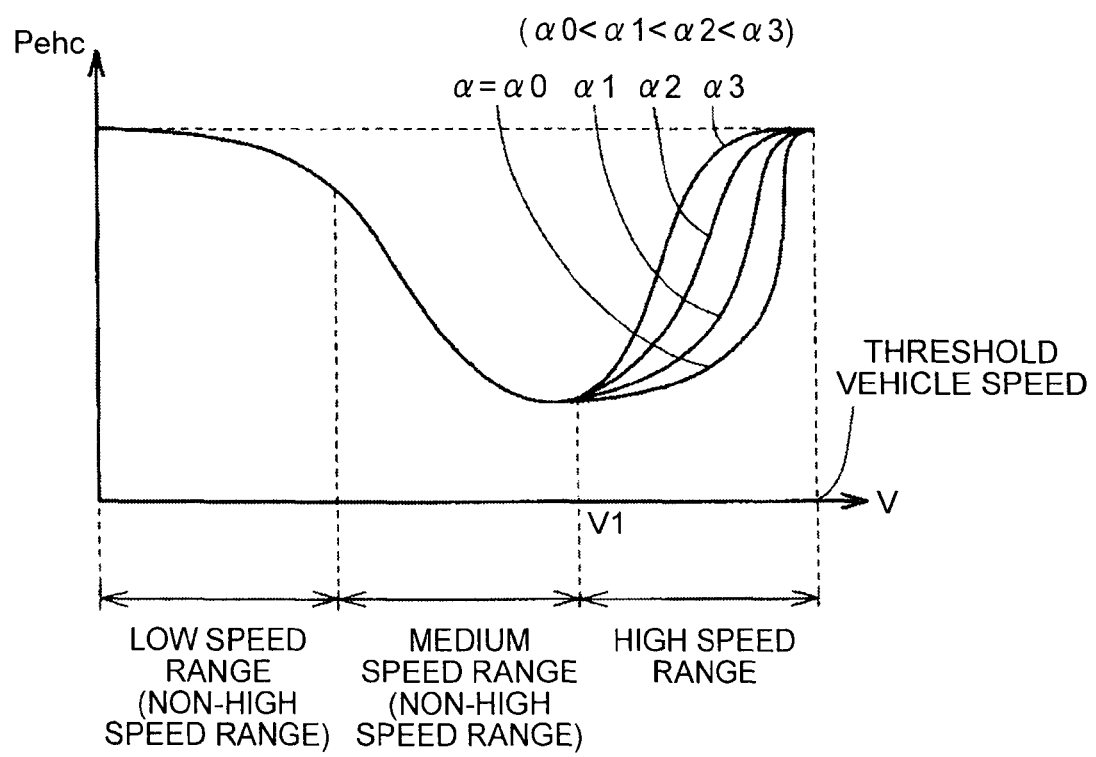
FIG. 3 is a view of an example of a corresponding relationship between a vehicle speed V and vehicle acceleration α, and an EHC energizing power Pehc according to the example embodiment.

FIG. 3 is a map showing one example of a corresponding relationship between the vehicle speed V and vehicle acceleration α, and the EHC energizing power Pehc. The ECU 200 determines the EHC energizing power Pehc corresponding to the current vehicle speed V and vehicle acceleration α using the map shown in FIG. 3. The corresponding relationship shown in FIG. 3 is only an example. The invention is not limited to this.

In a non-high speed range in which the vehicle speed V is less than a predetermined vehicle speed V1, i.e., in the low or medium speed range, the EHC energizing power Pehc is set to a larger value the lower the vehicle speed V is. That is, in the non-high speed range, it is assumed that the time until the required power exceeds the predetermined power, i.e., the time until the engine 10 is started due to Reason 1, will be shorter the lower the vehicle speed V is. Therefore, in the non-high speed range, the EHC energizing power Pehc is set to a larger value the lower the vehicle speed V is.

On the other hand, in a high speed range in which the vehicle speed V is equal to or greater than the predetermined vehicle speed V1, the EHC energizing power Pehc is set to a larger value the greater the vehicle speed V is and the greater the vehicle acceleration α is. That is, in the high speed range, the current vehicle speed V is quite close to the threshold value so it is assumed that the time until the vehicle speed V exceeds the threshold value, i.e., the time until the engine 10 is started due to Reason 2, will be shorter the higher the current vehicle speed V is and the higher the vehicle acceleration α is. Therefore, in the high speed range, the EHC energizing power Pehc is set to a larger value the higher the vehicle speed V is and the higher the vehicle acceleration α is. In FIG. 3, the values of the EHC energizing power Pehc when the vehicle acceleration α=α0, α1, α2, and α3 (α0<α1<α2<α3) are given as examples.

Determining the EHC energizing power Pehc in this way enables the EHC temperature at engine startup to be raised to equal to or higher than the activation temperature, so exhaust gas purifying performance after engine startup is able to be suitably ensured. After the EHC stops being energized, the EHC does not need to be energized again, so the problem of the power initially consumed by the EHC being wasted is also resolved.

Returning now to FIG. 2, when the EHC energizing power Pehc is determined, the ECU 200 proceeds on to step S14. In step S14, the ECU 200 electrically connects the PCU 60 to the EHC 140 by closing the relay of the switching unit 100, and controls the PCU 60 such that the EHC energizing power Pehc calculated in step S13 is supplied to the EHC.

In step S15, the ECU 200 determines whether a condition to stop energizing the EHC is satisfied. The condition to stop energizing the EHC may be, for example, the condition that the engine 10 has actually been started. If the condition to stop energizing the EHC is not satisfied (i.e., NO in step S15), the ECU 200 returns to step S11.

If the condition to stop energizing the EHC is satisfied (i.e., YES in step S15), the ECU 200 moves on to step S16, where the ECU 200 stops energizing the EHC by opening the relay of the switching unit 100.

As described above, the ECU 200 according to this example embodiment determines the EHC energizing power Pehc using the vehicle speed V and the vehicle acceleration α, when energizing the EHC before the engine 10 is started. As a result, the EHC energizing power Pehc is able to be determined according to the vehicle running pattern until the next time the engine is started. Thus, the exhaust gas purifying performance after the engine is started is able to be suitably ensured.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A vehicle comprising:
   an engine;
   an electrically heated catalyst configured to purify exhaust gas of the engine; and
   a controller configured to control energizing power to the electrically heated catalyst,
   the controller being configured to determine the energizing power based on a vehicle speed of the vehicle and an acceleration of the vehicle, when energizing the electrically heated catalyst before the engine is started, and
   the controller being configured to increase the energizing power as both: (i) the vehicle speed increases and (ii) the acceleration increases, when the vehicle speed is equal to or higher than a predetermined speed.

2. The vehicle according to claim 1, wherein the engine is started when a required power of the vehicle exceeds a predetermined amount or when the vehicle speed exceeds a vehicle-speed threshold value that is higher than the predetermined speed.

3. The vehicle according to claim 1, wherein the vehicle is a hybrid vehicle that runs by power of at least one of the engine and an electric motor.

4. A control method of a vehicle, the vehicle including an engine, an electrically heated catalyst, a vehicle speed sensor and an electronic control unit, the control method comprising:

detecting a vehicle speed of the vehicle, by the vehicle speed sensor, detecting an acceleration of the vehicle, by the electronic control unit, determining, by the electronic control unit, an energizing power based on the vehicle speed and the acceleration, when energizing the electrically heated catalyst before an engine is started, and determining, by the electronic control unit, the energizing power such that the energizing power increases as both: (i) the vehicle speed increases and (ii) the acceleration increases, when the vehicle speed is equal to or higher than a predetermined speed.

5. A vehicle comprising:

an engine;

an electrically heated catalyst configured to purify exhaust gas of the engine; and a controller configured to control energizing power to the electrically heated catalyst, the controller being configured to determine the energizing power based on a vehicle speed of the vehicle and an acceleration of the vehicle, when energizing the electrically heated catalyst before the engine is started, the controller being configured to increase the energizing power as both: (i) the vehicle speed increases and (ii) the acceleration increases, when the vehicle speed is equal to or higher than a predetermined speed, and the controller being configured to increase the energizing power as the vehicle speed decreases, when the vehicle speed is lower than the predetermined speed.

6. The vehicle according to claim 5, wherein the engine is started when a required power of the vehicle exceeds a predetermined amount or when the vehicle speed exceeds a vehicle-speed threshold value that is higher than the predetermined speed.

7. The vehicle according to claim 5, wherein the vehicle is a hybrid vehicle that runs by power of at least one of the engine and an electric motor.

8. A control method of a vehicle, the vehicle including an engine, an electrically heated catalyst, a vehicle speed sensor and an electronic control unit, the control method comprising:

detecting a vehicle speed of the vehicle, by the vehicle speed sensor, detecting an acceleration of the vehicle, by the electronic control unit, determining, by the electronic control unit, an energizing power based on the vehicle speed and the acceleration, when energizing the electrically heated catalyst before an engine is started, determining, by the electronic control unit, the energizing power such that the energizing power increases as both: (i) the vehicle speed increases and (ii) the acceleration increases, when the vehicle speed is equal to or higher than a predetermined speed, and determining, by the electronic control unit, the energizing power such that the energizing power increases as the vehicle speed decreases, when the vehicle speed is lower than the predetermined speed.

* * * * *